United States Patent [19]

Yaeger

[11] Patent Number: 4,684,913

[45] Date of Patent: Aug. 4, 1987

[54] SLIDER LIFTER

[75] Inventor: John R. Yaeger, Sunnyvale, Calif.

[73] Assignee: Raychem Corporation, Menlo Park, Calif.

[21] Appl. No.: 905,082

[22] Filed: Sep. 5, 1986

[51] Int. Cl.$^4$ ............................................. H01H 85/04
[52] U.S. Cl. ...................................... 337/140; 60/527
[58] Field of Search .................. 337/140; 60/526, 527, 60/528, 529

[56] References Cited

U.S. PATENT DOCUMENTS

| | | | |
|---|---|---|---|
| 3,483,360 | 12/1969 | Perry | 219/512 |
| 3,594,674 | 7/1971 | Willson | 337/140 |
| 3,613,732 | 10/1971 | Willson | 251/11 |
| 3,634,803 | 1/1972 | Willson | 337/140 |
| 3,652,969 | 3/1972 | Willson et al. | 337/140 |
| 3,676,815 | 7/1972 | Du Rocher | 337/140 |
| 3,707,694 | 12/1972 | Du Rocher | 337/139 |
| 3,849,756 | 11/1974 | Hickling | 337/140 |
| 3,872,415 | 3/1975 | Clarke | 337/140 |
| 3,968,380 | 7/1976 | Jost et al. | 337/140 |
| 4,205,293 | 5/1980 | Melton et al. | 337/140 |
| 4,517,543 | 5/1985 | Brubaker | 60/527 |
| 4,551,974 | 11/1985 | Yaeger et al. | 60/527 |
| 4,565,589 | 1/1986 | Harrison | 148/402 |

FOREIGN PATENT DOCUMENTS 57-222046 6/1984 Japan .
2026246A 9/1978 United Kingdom .

Primary Examiner—Harold Broome
Attorney, Agent, or Firm—Ira D. Blecker

[57] ABSTRACT

A slider lifter including a support structure, a flexure arm and a resilient means cantilevered from the support structure, and a shape memory alloy element operatively connected between the support structure and the resilient means, wherein the shape memory alloy element has a martensitic condition and an austenitic condition. The shape memory alloy element in one of the martensitic and austenitic conditions cooperates with the resilient means to elastically deform the flexure arm from an undeformed position to a deformed position. The shape memory alloy element in the other of the martensitic and austenitic conditions cooperates with the resilient means to both move away from the fexure arm, thereby allowing the flexure arm to return towards its undeformed position. It is most preferred that when the resilient means moves away from the flexure arm, the flexure arm and the resilient means are not in contact. This allows the flexure arm to return to its completely undeformed position.

10 Claims, 9 Drawing Figures

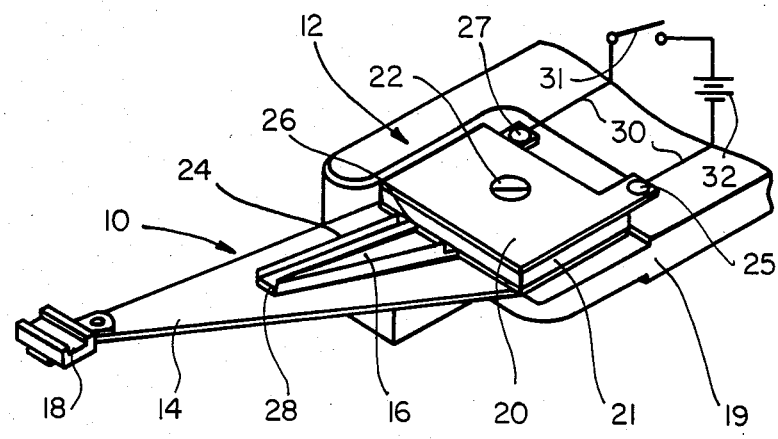
FIG_1
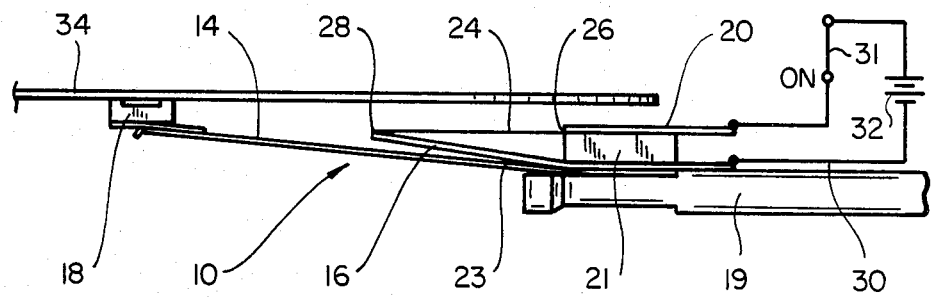
FIG_2
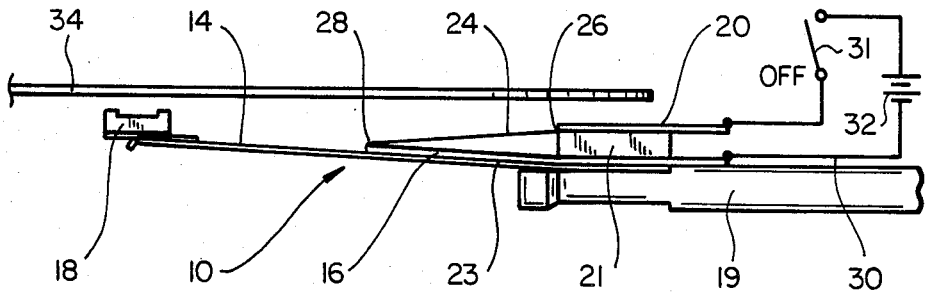
FIG_3

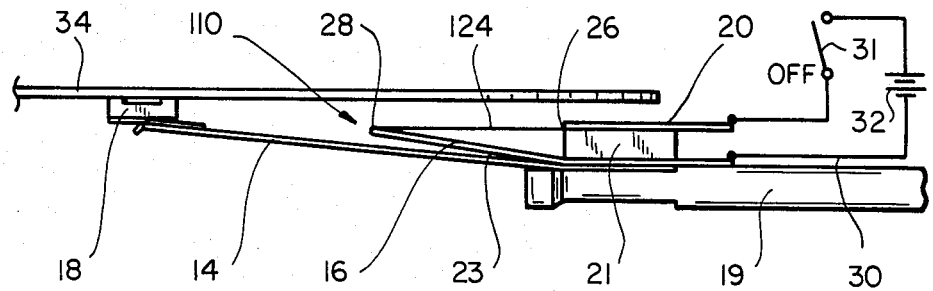
FIG_4
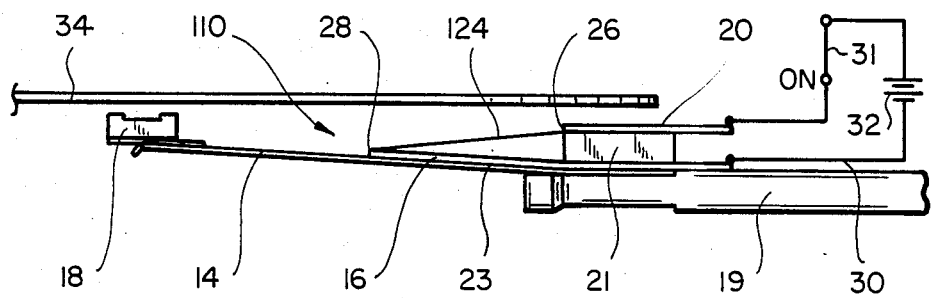
FIG_5
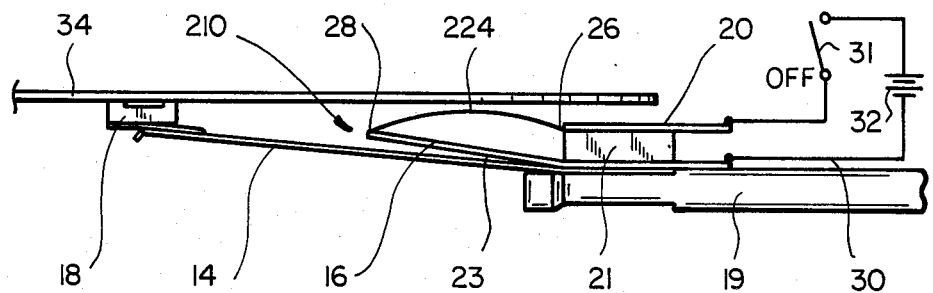
FIG_6

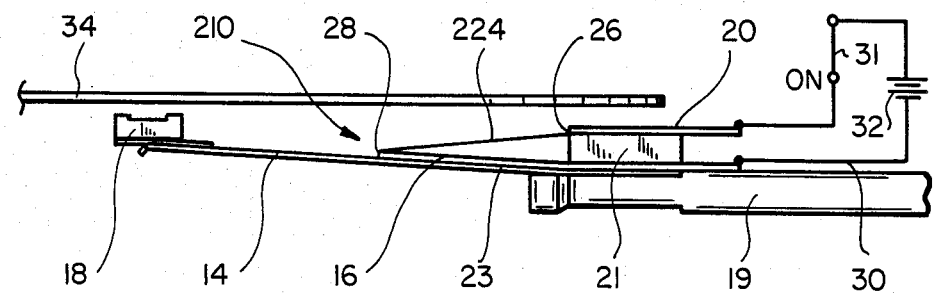
FIG_7
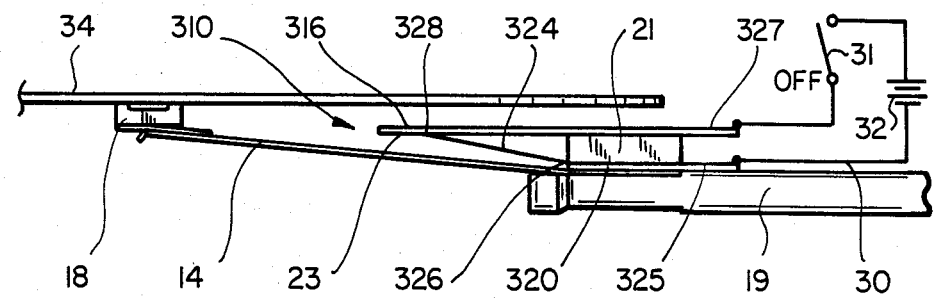
FIG_8
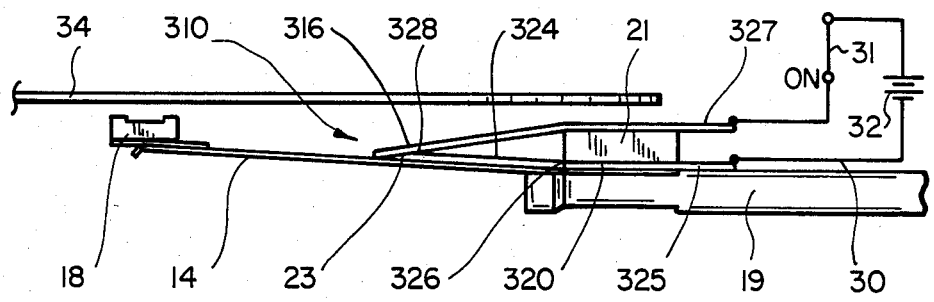
FIG_9

SLIDER LIFTER

BACKGROUND OF THE INVENTION

This invention relates to the field of slider lifters and more particularly relates to slider lifters incorporating shape memory alloys.

Various electromechanical devices have been proposed utilizing shape memory alloys. Among these are: Perry U.S. Pat. No. 3,483,360; Willson U.S. Pat. No. 3,594,674; Willson et al U.S. Pat. Nos. 3,613,732; 3,634,803; and 3,652,969; Du Rocher U.S. Pat. Nos. 3,676,815 and 3,707,694; Hickling U.S. Pat. No. 3,849,756; Clarke U.S. Pat. No. 3,872,415; Jost et al U.S. Pat. No. 3,968,380; Melton et al U.S. Pat. No. 4,205,293; Brubaker U.S. Pat. No. 4,517,543; and Sims U.K. Patent Application 2,026,246A.

These devices typically take advantage of the shape memory effect to trip a switch or break a contact upon reaching a critical temperature.

The phenomenon of shape memory is, of course, well known. The ability to possess shape memory is a result of the fact that the shape memory alloy undergoes a reversible transformation from an austenitic state to a martensitic state with a change in temperature. An article made of such an alloy is easily deformed from its original configuration to a new configuration when cooled below the temperature at which the alloy is transformed from the austenitic state to the martensitic state. The temperature at which this transformation begins is usually referred to as the $M_s$ temperature and the temperature at which this transformation is complete is the $M_f$ temperature. When an article thus deformed is warmed to the temperature at which the alloy starts to revert back to austenite, referred to as the $A_s$ temperature, the deformed object will begin to return to its original configuration. The reversion of the alloy will be complete upon reaching the $A_f$ temperature.

The shape memory alloys that have been used with the above actuators are usually either copper-based or nickel/titanium-based. These alloys are well known to those skilled in the art.

Those who are familiar with computers are aware of so-called Winchesters which are units for storing data on hard discs. The units basically consist of a disc drive unit, a hard disc and a read/write head or slider for retrieving data from the hard disc. The slider is typically cantilevered over the hard disc from a supporting structure by a flexure arm. Other types of disc drive units are configured in a similar manner.

The slider rests on a landing zone on the disc while the power is off. In operation, the drive unit is powered up and the disc begins to rotate. After the disc reaches a certain speed, the slider rises up slightly off the landing zone due to small air currents which push up on the slider. However, until the slider rises, there is considerable friction associated with head drag on the disc which causes wear to the slider and the disc. When the unit is powered down, the same friction occurs until the disc stops rotating.

In order to accommodate this friction, the discs are coated with a protective layer and lubricants are applied. Additionally, the discs often require a landing zone where no data can be stored. Consequently, the amount of data that can be stored on a disc is reduced. Too, a larger disc drive motor is required to overcome the adverse frictional effects and a motor brake is often necessary to stop the rotation of the disc when the motor is turned off to reduce frictional wear.

It can thus be appreciated that it would be desirable to raise the slider during power up and keep it raised during power down so as to eliminate the adverse effects of friction.

Accordingly, in Japanese Patent Application No. 57-222046 and Yaeger et al U.S. Pat. No. 4,551,974, it has been proposed to utilize shape memory alloys to cause the slider to be raised or lowered. In each of these references, the shape memory alloy element works in conjunction with a biasing means which also happens to be the flexure arm.

The difficulty with these references, most apparent with the Japanese reference, is that alteration of the characteristics of the flexure arm is required to make the device work. The lack of commercial success of these devices is due, at least in part, to this fact. Disc drive manufacturers are loathe to change any aspect of the flexure arm. The reason for this attitude is that the combined flexure arm and slider are very sensitive as to their loading and airfoil characteristics. A great deal of time and effort has gone into their design. Accordingly, any design that requires the assistance of the flexure arm, and thus a redesign of the flexure arm as well, is looked upon with disfavor.

Therefore, it is an object of the invention to have a device to raise and lower the slider without adversely affecting the flexure arm.

It is a further object of the invention to have such a device which is simple in design and economical to produce.

These and other objects of the invention will become more apparent after referring to the following description considered in conjunction with the accompanying drawings.

BRIEF SUMMARY OF THE INVENTION

There is disclosed according to the invention a slider lifter comprising a support structure, a flexure arm and a resilient means cantilevered from the support structure, and a shape memory alloy element operatively connected between the support structure and the resilient means, wherein the shape memory alloy element has a martensitic condition and an austenitic condition. The shape memory alloy element in one of the martensitic and austenitic conditions cooperates with the resilient means to elastically deform the flexure arm from an undeformed position to a deformed position. The shape memory alloy element in the other of the martensitic and austenitic conditions cooperates with the resilient means to both move away from the flexure arm, thereby allowing the flexure arm to return towards its undeformed position.

It is most preferred that when the resilient means moves away from the flexure arm, the flexure arm and the resilient means are not in contact. This allows the flexure arm to return to its completely undeformed position.

As will become more apparent hereafter the slider lifter according to the invention performs its function without adversely affecting the design characteristics of the flexure arm.

BRIEF DESCRIPTION OF THE DRAWINGS

FIG. 1 is a perspective view of a slider lifter according to the invention.

FIGS. 2 and 3 are side views of the slider lifter according to the invention with the power on and with the power off, respectively.

FIGS. 4 and 5 are side views of another embodiment of the slider lifter according to the invention with the power off and with the power on, respectively.

FIGS. 6 and 7 are side views of a further embodiment of the slider lifter according to the invention with the power off and with the power on, respectively.

FIGS. 8 and 9 are side views of still another embodiment of the slider lifter according to the invention with the power off and with the power on, respectively.

DETAILED DESCRIPTION OF THE INVENTION

According to one aspect of the invention there is disclosed a slider lifter comprising a support structure, a flexure arm and a resilient means cantilevered from the support structure, and a shape memory alloy element operatively connected between the support structure and the resilient means with the shape memory alloy element having a martensitic condition and an austenitic condition. The shape memory alloy element in one of the martensitic and austenitic conditions cooperates with the resilient means to elastically deform the flexure arm from an undeformed position to a deformed position. The shape memory alloy element in the other of the martensitic and austenitic conditions cooperates with the resilient means to both move away from the flexure arm, thereby allowing the flexure arm to return towards its undeformed position.

It is most preferred that the shape memory element and resilient means further cooperate so that when the shape memory alloy element is in the other of the martensitic and austenitic conditions, the resilient means and shape memory alloy element move away from the flexure arm so that the flexure arm and the resilient means are not in contact. This allows the flexure arm to return to its completely undeformed position.

There is disclosed according to the invention another aspect of the invention. Thus, there is a slider lifter comprising a support structure, a flexure arm and a resilient means cantilevered from the support structure, and a shape memory alloy element operatively connected between the support structure and the resilient means, the shape memory alloy element having a martensitic condition and an austenitic condition. The shape memory alloy element in the martensitic condition allows the resilient means to contact and elastically deform the flexure arm from an undeformed position to a deformed position. The shape memory alloy element in the austenitic condition elastically deforms the resilient means away from the flexure arm, thereby allowing the flexure arm to return towards its undeformed position.

Referring to the drawings in more detail and particularly referring to FIGS. 1 to 3 there is shown the slider lifter according to the invention. For clarity, a disc is not shown in place. The slider lifter 10 has a suitable support structure generally indicated by 12 which is connected to other structure (not shown) of a disc drive unit. There is a flexure arm 14 and a resilient means 16 cantilevered from the support structure 12. The flexure arm 14 is the standard flexure arm which is typically used in the manufacture of Winchester disc drives. At the end of the flexure arm 14 is the slider 18 or read/write head. The resilient means 16, as shown in FIG. 1 is a leaf spring; however, it is contemplated within the scope of the invention that the resilient means may take other forms.

The slider lifter 10 further comprises a shape memory alloy element 24 which is operatively connected between the support structure 12 at 26 and the resilient means 16 at 28. As shown in FIGS. 1 to 3, the shape memory alloy element may take other forms as will become apparent hereafter. The shape memory alloy element has a martensitic condition and an austenitic condition.

The support structure generally consists of moveable carriage 19, plate 20, insulating spacer 21 and screw 22. Flexure arm 14 and resilient means 16 are trapped between the insulating spacer 21 and the carriage 19. The shape memory alloy element 24 is attached, e.g. by soldering, to plate 20. Similarly, the shape memory alloy element 24 may be attached also to resilient means 16 by soldering. The insulating spacer 21 is preferably made from a rigid, non-conducting material such as nylon 6,6, high density polyethylene or ceramic material. In the preferred embodiment, plate 20 is molded into insulating spacer 21. Screw 22 secures the insulating spacer 21 to the carriage 19; however, screw 22 passes through resilient means 16 without making electrical contact therewith. Screw 22 only makes contact between the insulating spacer 21 and the carriage 19 so as not to electrically short out the plate 20 and resilient means 16.

There is additionally an insulating coating 23 applied to the bottom surface of the resilient means 16 to prevent the resilient means 16 from electrically shorting against the flexure arm 14 or carriage 19. This insulating coating 23 is commonly sprayed on the surface of the resilient means 16 and may be, for example, TEFLON® (TEFLON is tetrafluoroethylene and is a product of E. I. DuPont de Nemours). Furthermore, the insulating coating 23 acts as a lubricating means between resilient means 16 and flexure arm 14 when they are in contact, thereby preventing frictional debris from being generated and interferring with the operation of the disc drive in general.

Extending from the back of the slider lifter 10 are electrical leads 30 which lead to a suitable power source 32 and switch 31. One lead is attached to tab 25 of plate 20. The other lead is attached to tab 27 of resilient means 16. When switch 31 is closed, current flows through shape memory alloy element 24.

Referring now to FIG. 3 the shape memory alloy element 24 is in the martensitic condition and thus in its weakened state. The resilient means 16 is designed so that it can overcome the strength of the martensitic shape memory alloy element. Since the shape memory alloy element 24 can not restrain the movement of the resilient means 16 the resilient means is allowed to contact the flexure arm 14 and elastically deform it from an undeformed position to a deformed position. At this point the slider 18 is removed from the disc 34.

Referring now to FIG. 2, the shape memory alloy element 24 is caused to transform to its austenitic condition. The transformation occurs due to the heating, by resistance, of the shape memory alloy element. The heating is supplied by the power source 32 which is activated when the power to the disc drive is turned on by closing switch 31. When the shape memory alloy element 24 is in the austenitic condition the element 24 elastically deforms the resilient means 16 away from the flexure arm 14. This occurs because when the shape memory alloy element goes through the transformation from martensite to austenite, the element's dimensions change from the lengthened, deformed state in FIG. 3 to the shortened, undeformed state in FIG. 2. When the shape memory alloy element 24 is in the austenitic condition, it has greater strength than the resilient means 16. Accordingly, the shape memory alloy element is able to pull the resilient means 16 away from the flexure arm 14. The flexure arm 14 is then able to return towards its undeformed position. As shown in FIG. 2 this undeformed position is with the slider resting on, or just above, the surface of the disc for its normal read/write operation, depending on the speed of the disc.

As is apparent the flexure arm 14 and the resilient means 16 are resiliently opposed to one another. It is preferred that the resilient means 16 exerts a greater biasing force than the flexure arm 14 so that in the absence of the shape memory alloy element 24 the resilient means 16 elastically deforms the flexure arm 14. That is, the flexure arm and the resilient means work in opposition to one another so that unless the resilient means is somehow restrained by the shape memory alloy element the resilient means will push the flexure arm into its deformed position. In this deformed position the slider is removed from the surface of the disc.

As stated earlier when the shape memory alloy element 24 is in the austenitic condition it elastically deforms the resilient means 16 away from the flexure arm 14. It is most preferred that when the resilient means 16 is so deformed that the flexure arm 14 and the resilient means 16 (and the shape memory alloy element 24 as well) are not in contact at all. This allows the flexure arm 14 to return to its completely undeformed position. This is important because when the flexure arm returns to its undeformed position it is left completely unrestrained by the resilient means as well as the shape memory alloy element. Thus the loading and airfoil characteristics of the flexure arm and slider 18 will be unaffected by the lifting mechanism of the slider lifter.

While the Figures only show one slider lifter per disc, it is of course understood that there will normally be two slider lifters per disc—one above the disc and one below it. For clarity, the slider lifter above the disc is not shown. If more than one slider is used on a given disc side, then a separate slider lifter may be used for each slider. It is similarly within the scope of the invention that a single slider lifter could be adapted to lift multiple sliders.

While many shape memory alloys will be suitable for the shape memory alloy element it is preferred that the shape memory alloy element be made from a nickel/titanium-based shape memory alloy. Among the preferred alloys are the nickel/titanium/copper alloys disclosed in Harrison U.S. Pat. No. 4,565,589 (which is incorporated by reference herein) and the binary alloys such as 49.4 Nickel/50.6 Titanium (in atomic percent).

As is apparent in this embodiment of the invention it is necessary that a small maintenance level of current be directed through the shape memory alloy element so as to maintain the slider in the proper position while the power is on. However, this is not considered to be a serious disadvantage.

A further aspect, according to the invention, relates to a slider lifter comprising a support structure, a flexure arm and a resilient means cantilevered from the support structure, and a shape memory alloy element operatively connected between the support structure and the resilient means. The shape memory alloy element has a martensitic condition and an austenitic condition. The shape memory alloy element while in the austenitic condition elastically deforms the resilient means and the flexure arm from an undeformed position to a deformed position. The shape memory alloy element while in the martensitic condition is deformed by the resilient means and the resilient means moves away from the flexure arm, thereby allowing the flexure arm to return towards its undeformed position.

Referring again to the Figures and particularly referring to FIGS. 4 and 5 there are shown side views of this embodiment of the slider lifter 110. As will be appreciated this slider lifter has the same basic components of the slider lifter discussed previously except the operation of the various cooperating elements is slightly different. Thus the slider lifter 110 comprises the support structure, generally indicated by 12, and a flexure arm 14 and a resilient means 16 cantilevered from the support structure 12. Similarly the slider lifter 110 further comprises a shape memory alloy element 124 operatively connected between the support structure 12 and the resilient means 16. The shape memory alloy element has a martensitic condition and an austenitic condition.

As mentioned above the flexure arm 14 is the standard flexure arm that is typically used in disc drives such as Winchesters. The resilient means 16, as shown in FIGS. 4 and 5, is a leaf spring but may be other resilient means as will be apparent to one skilled in the art.

The difference in this embodiment of the slider lifter 110 is in the cooperation of the shape memory alloy element 124 and the resilient means 16. Referring particularly to FIG. 5 the shape memory alloy element 124 has transformed to the austenitic condition due to power from power source 32 being directed through the shape memory alloy element 124 thereby resistantly heating the element so as to cause the transformation. The shape memory alloy element 124 lengthens so as to push upon and elastically deform the resilient means 16 which in turn pushes upon the flexure arm 14 causing the deformation of the flexure arm from an undeformed position to a deformed position. The flexure arm 14 is moved away from the disc 34 so that the slider 18 is removed from surface contact with the disc 34. When power is turned off to the shape memory alloy element it cools down and transforms to the martensitic condition. At this point, as shown in FIG. 4, the resilient means 16 can overcome the weakened martensitic condition of the shape memory alloy element 124 and deform it. The shape memory alloy element 124 no longer being in its high strength condition cannot keep the resilient means 16 against the flexure arm 14. The resilient means 16 is then able to move away from the flexure arm 14. The flexure arm 14, no longer being restrained by the shape memory alloy element 124 and the resilient means 16 is able to return to its undeformed position wherein the slider rests on, or nearly on, the surface of the disc to perform its read/write function.

In the earlier embodiments of the slider lifter as shown in FIGS. 1 to 3, the shape memory alloy element was a wire or other similar element. However, in the embodiment as shown in FIGS. 4 and 5, it is necessary for the shape memory alloy element to have a different form so as to be able to push upon the resilient means. This being the case the shape memory alloy element could be in the form of, for example, a rod which would just be a wire having a thickened cross section.

Alternatively, as shown in FIGS. 6 and 7, the shape memory alloy element 224 could be in the shape of a bow with the ends of the bow attached to the support structure and the resilient means 16. The bow would straighten out, or nearly straighten out upon reaching its austenitic transformation temperature. Except for the different shape memory alloy element 224, the operation of the slider lifter 210 in FIGS. 6 and 7 is identical to the slider lifter 110 in FIGS. 4 and 5. In any case, other forms of the shape memory alloy element will come to those who are skilled in the art. These other forms are nevertheless contemplated within the scope of the invention.

Referring now to FIGS. 8 and 9, there is shown a further embodiment of the slider lifter 310. This embodiment of the slider lifter is similar to the slider lifter 10 shown in FIGS. 1 to 3 except the positions of the resilient means and shape memory alloy element are flipped over. The operation of the slider lifter 310, however, is similar to slider lifters 110 and 210 discussed previously. That is, the resilient means 316 and flexure arm 14 are both cantilevered from the support structure, generally indicated by 12. The shape memory element 324 is operatively connected between the support structure at 326 and the resilient means at 328. In this embodiment, however, plate 20 shown in FIGS. 1 to 7 is no longer necessary. Rather, plate 320 is inserted between insulating space 21 and flexure arm 14. Then, a shape memory alloy element may be attached, e.g. by soldering, to plate 320. The leads 30 would be connected to tab 327 of resilient means 316 and tab 325 of plate 320. Resilient means 316 at least at its distal end and plate 320 would need an insulated coating 23, as discussed previously, to avoid shorting out against the flexure arm 14.

When switch 31 is closed, as shown in FIG. 9, the shape memory alloy element 324 tranforms to its austenitic condition and contracts. In so doing, it pulls resilient means 316 into contact with flexure arm 14 and deforms the flexure arm 14 from an undeformed position to a deformed position. When power to the slider lifter 310 is turned off by opening switch 31, the shape memory alloy element 324 transforms to its martensitic condition. Resilient means 316 is then able to overcome the shape memory alloy element 324 and move away from the flexure arm as shown in FIG. 8. The flexure arm 14 is then able to return towards its undeformed position.

When the shape memory alloy elements 124, 224 and 324 (of FIGS. 4 to 9) are in the martensitic condition and when the resilient means 16 is thus able to move away from the flexure arm 14 it is most preferred that the flexure arm and the resilient means are not in contact. This allows the flexure arm to return to its completely undeformed position. As mentioned above, when the flexure arm is allowed to return to its completely undeformed position it is not in contact with the resilient means or the shape memory alloy element. Thus the loading and airfoil characteristics of the flexure arm and slider are not adversely affected by the slider lifter structure according to the invention.

Again, while the shape memory alloy elements 124, 224 and 324 may be made from a variety of shape memory alloys it is preferred that they be made from a nickel/titanium-based shape memory alloy such as the binary and ternary alloys mentioned above.

In the embodiments of the invention shown in FIGS. 4 to 9, the slider rests on the disc when there is no power to the disc drive. At power on (switch 31 is closed) the slider is lifted from the surface of the disc before the disc motor is actually started. The slider is then lowered (power to the slider lifter is turned off) when the disc attains proper operating speed. There is no power applied to the slider lifter during normal operation of the disc drive.

As will be apparent to those skilled in the art the advantages of all the embodiments of the invention are many. Some of these advantages, for purposes of illustration and not of limitation, are a smaller disc motor can be used because power from the motor is not used to overcome static and startup friction associated with slider drag on the disc. Too, the need to stop the motor quickly is removed if there is no slider/disc friction. Thus, it is possible to eliminate the motor brake. Similarly, disc lubricants are not necessary since the slider never touches the disc. As a side benefit fewer contaminates are introduced since slider/disc friction is eliminated. Finally, the storage capacity of the disc can be increased by a substantial amount by eliminatinq the landing zone which is normally present on the disc.

It cannot be too strenuously emphasized that the many advantages of the invention have been accomplished without alteration of the characteristics of the flexure arm. As noted previously disc drive manufacturers are loathe to change any aspect of the flexure arm since the combined flexure arm and slider are very sensitive as to their loading and airfoil characteristics. A great deal of time and effort has gone into the design of the flexure arm and therefore modifications of the flexure arm will not usually be tolerated. Applicant, however, has devised a very advantageous design without alteration of this flexure arm.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

I claim:

1. A slider lifter comprising:
   a support structure;
   a flexure arm and a resilient means cantilevered from said support structure; and
   a shape memory alloy element operatively connected between said support structure and said resilient means, said shape memory alloy element having a martensitic condition and an austenitic condition;
   said shape memory alloy element in one of the martensitic and austenitic conditions cooperating with said resilient means to elastically deform said flexure arm from an undeformed position to a deformed position;
   said shape memory alloy element in the other of the martensitic and austenitic conditions cooperating with said resilient means to move away from said flexure arm, thereby allowing said flexure arm to return towards its undeformed position.

2. The slider lifter of claim 1 wherein said shape memory alloy element and said resilient means cooperate so that when the shape memory alloy element is in the other of the martensitic and austenitic conditions, said resilient means moves away said flexure arm so that said flexure arm and said resilient means are not in contact, thereby allowing said flexure arm to return to its undeformed position.

3. A slider lifter comprising:
   a support structure;
   a flexure arm and a resilient means cantilevered from said support structure; and a shape memory alloy element operatively connected between said support structure and said resilient means, said shape memory alloy element having a martensitic condition and an austenitic condition;

said shape memory alloy element in the martensitic condition allowing said resilient means to contact and elastically deform said flexure arm from an undeformed position to a deformed position;

said shape memory alloy element in the austenitic condition elastically deforming said resilient means away from said flexure arm, thereby allowing said flexure arm to return towards its undeformed position.

4. The slider lifter of claim 3 wherein said flexure arm and said resilient means are resiliently opposed to one another.

5. The slider lifter of claim 4 wherein said resilient means exerts a greater biasing force than said flexure arm so that in the absence of said shape memory alloy element, said resilient means elastically deforms said flexure arm.

6. The slider lifter of claim 3 wherein said shape memory alloy element in the austenitic condition elastically deforms said resilient means away from said flexure arm so that said flexure arm and said resilient means are not in contact, thereby allowing said flexure arm to return to its undeformed position.

7. The slider lifter of claim 3 wherein said shape memory alloy element comprises a nickel/titanium-based shape memory alloy.

8. A slider lifter comprising:
a support structure;
a flexure arm and a resilient means cantilevered from said support structure; and
a shape memory alloy element operatively connected between said support structure and said resilient means, said shape memory alloy element having a martensitic condition and an austenitic condition;
said shape memory alloy element in the austenitic condition elastically deforming said resilient means and said flexure arm from an undeformed position to a deformed position;
said shape memory alloy element in the martensitic condition being deformed by said resilient means wherein said resilient means moves away from said flexure arm, thereby allowing said flexure arm to return towards its undeformed position.

9. The slider lifter of claim 8 wherein said shape memory alloy element in the martensitic condition being deformed by said resilient means wherein said resilient means moves away from said flexure arm so that said flexure arm and said resilient means are not in contact, thereby allowing said flexure arm to return to its undeformed position.

10. The slider lifter of claim 6 wherein said shape memory alloy element comprises a nickel/titanium-based shape memory alloy.

* * * * *